United States Patent
Andersson et al.

(10) Patent No.: US 8,127,132 B2
(45) Date of Patent: Feb. 28, 2012

(54) METHOD AND APPARATUS FOR EXECUTING INDUSTRIAL MANUFACTURE

(75) Inventors: Johann Andersson, Västerås (SE); Mikael Rudin, Västerås (SE); Thomas Pauly, Västerås (SE)

(73) Assignee: Abb AB (SE)

( * ) Notice: Subject to any disclaimer, the term of this patent is extended or adjusted under 35 U.S.C. 154(b) by 1676 days.

(21) Appl. No.: 09/962,323

(22) Filed: Sep. 26, 2001

(65) Prior Publication Data
US 2002/0046290 A1    Apr. 18, 2002

(30) Foreign Application Priority Data
Oct. 12, 2000 (SE) ........................................ 0003746

(51) Int. Cl.
*H04L 29/06* (2006.01)
*G06F 21/00* (2006.01)
*G06F 7/04* (2006.01)
*G06F 12/14* (2006.01)
*G08B 23/00* (2006.01)

(52) U.S. Cl. ........ 713/167; 713/161; 713/166; 713/182; 726/3; 726/4; 726/5; 726/6; 726/17; 726/18; 726/19; 726/21; 726/22

(58) Field of Classification Search .................. 713/200, 713/161, 166, 167, 182; 726/3–6, 17–19, 726/21, 22
See application file for complete search history.

(56) References Cited

U.S. PATENT DOCUMENTS

| 5,335,346 | A | | 8/1994 | Fabbio |
| 5,539,906 | A | * | 7/1996 | Abraham et al. ................. 707/9 |
| 5,878,415 | A | | 3/1999 | Olds |
| 5,903,720 | A | * | 5/1999 | Stokes .............................. 726/4 |
| 6,047,377 | A | | 4/2000 | Gong |
| 6,088,679 | A | | 7/2000 | Barkley |
| 6,202,158 | B1 | * | 3/2001 | Urano et al. .................... 726/22 |
| 6,615,258 | B1 | * | 9/2003 | Barry et al. .................... 709/223 |
| 6,823,338 | B1 | * | 11/2004 | Byrne et al. ..................... 707/9 |
| 6,854,016 | B1 | * | 2/2005 | Kraenzel et al. ............. 709/229 |
| 6,944,584 | B1 | * | 9/2005 | Tenney et al. .................. 703/22 |

FOREIGN PATENT DOCUMENTS
EP          0583108          7/1992

* cited by examiner

*Primary Examiner* — Aravind Moorthy
(74) *Attorney, Agent, or Firm* — Dykema Gossett PLLC

(57) ABSTRACT

A software object is positioned in structures, such as a functional structure, location structure and order structure, where each structure consists of a hierarchy of software objects. In each structure the software object inherits security from other software objects in the hierarchy. Since the software object is inserted into multiple hierarchical structures the security of the software object is inherited from software objects in multiple hierarchical structures. The user authority to interact with a software object is, in addition to the identity of the user logged in, dependent on the inherited security of the software object. As a software object is inserted, deleted and moved in a hierarchical structure the security of the software object changes.

12 Claims, 7 Drawing Sheets

METHOD AND APPARATUS FOR EXECUTING INDUSTRIAL MANUFACTURE

TECHNICAL FIELD

The present invention relates to a computer system, such as a control system. The invention also relates to other computer systems such as a manufacturing execution system. In particular the present invention relates to a system for security in such systems. The invention provides user authority for access to software objects that represent real world objects. The invention also relates to a method for configuring security in a computer system. Further the invention relates to a computer program product for arranging security.

BACKGROUND ART

Security of a computer-based system involves verifying that a user has the relevant authority before the user can perform actions such as invoke a program, open a file or perform certain operations on certain entities.

In a computer-based control and manufacturing execution system individual users are defined as members of a group such as operator, engineer, planner or manager. This approach is common in industries such as chemical, pharmaceutical, food, metal, mines, pulp and paper. Other industries and utilities where the same approach is used are automotive, consumer products, power generation, power distribution, waste water handling, oil refineries, gas pipe-lines and off-shore platforms. Traditional methods for security in control and manufacturing systems are based on permissions a certain user has to perform certain operations on certain entities. As an example, in a control and manufacturing system the authority scheme for a traditional human machine interface would allow certain users access to certain entities through certain displays. An operator having supervision and control responsibility of the dryer in a pulp mill would have authority to access graphical displays and control templates for the drying section of a pulp mill. A manager at the same pulp mill could have authority to access and view the same graphical displays for information purposes but that manager would not have access to the corresponding control templates.

A description of a security and authority scheme in a conventional control system is known from U.S. Pat. No. 4,886,590. A hierarchy of authorization keys limits access to the apparatus depending upon the level of the authority of the person seeking access. Different degrees of authority may be delegated for an apparatus operator, a supervisor and servicing personnel. In the lowest authorization level an operator can operate the apparatus. At the next higher authorization level, operating parameters such as target points and batch characteristics may be altered. In the highest authorization level, alterations can be made to the system software. The authorization is static as a user is logged on to the system.

A problem in a conventional control and manufacturing execution system is that the security does not adapt to changes in relationship between different entities. Such changes may for example be caused by the progress of a specific batch between different sections of production equipment, or the progress through different stages of preparation of a production order or a customer invoice. For instance while a real world entity, such as a batch of pharmaceuticals, is in production planning phase it is applicable to get access to a software function for allocation of raw-material. As the batch has been manufactured and goes into the product warehouse it is no longer applicable to allocate raw material for that batch. However, instead security in a conventional control and manufacturing execution system is limited to that certain users have access only to certain predefined views, displays and tools in the system.

Another problem in a conventional control and manufacturing execution system is, in a more efficient way, to arrange software objects and let a user access different perspectives of software objects in a secure manner. The large number of real world entities that are represented in the system is in itself a challenge since they may exist in numbers of thousands up to several millions. Further, each of the real world entities is represented in several software applications. The different software applications in a control and manufacturing execution system is typically between ten and one hundred.

A control system may in itself be regarded as a software application. Examples of functions in control system are a graphical display of process equipment, a list of active alarms, a trend curve display and a configuration of a control program. Another example of a software application is a maintenance software that include functions for fault reports, maintenance history, planned maintenance, list of associated spare parts, down-time analysis etc. Another example of a software application is a simulation package that includes functions such as what-if analysis before introducing changes of set point to a polymer reactor.

A task of a control and manufacturing system is to find a suitable representation of different relations between real world entities. As an example a real world entity such as a vessel belongs to a production plant, it has been installed in specific building on a certain floor. The same vessel is part of a liquid processing line and is a member of a unit the function of which is to mix ingredients. At a certain point in time, the vessel is allocated to the production of a certain batch. To the vessel a number of units are tied, which handle the actual control of the process. Examples of units tied to a real world entity such as a vessel are controllers, Programmable Logical Controllers (PLCs) and intelligent and non-intelligent field devices. The controllers, PLCs and field devices can in turn be tied to other real world entities in addition to the vessel.

Another task of a computer system is to provide a user access and manage different kinds of information about entities at an industrial plant. This is complicated by the fact that information and functionality related to these entities are spread across many different software applications. In a control and manufacturing execution system there is usually some common ground between software applications regarding standards. With the progress of de-facto standards such as Transmission Control Protocol/Internet Protocol (TCP/IP), Hyper Text Meta Language (HTML) and Extensible Markup Language (XML) remote access from one industrial plant to another is increasingly carried out using the Internet technology. Another important standard is published by Microsoft (Trademark) and is called Component Object Model (COM). COM describes a standard for interoperability between parts of one or more software applications. The specification is available in the Microsoft Developer Network (MSDN) online web site. But in a conventional control and manufacturing execution system this common ground in technology is seldom transformed into a substantial degree of integration where the user, for instance the operator of a control system, has access to and in an efficient way can use functions in different software applications at a production plant. One reason why operators and other users of a control system commonly are refused the benefits of integrated systems is that information and access to functions related to a certain real world entity are spread across a number of different software applications.

In a conventional control and manufacturing execution system user authority is tied to a certain software application. One physical person could very well be associated with several users. Each user would have an authority configuration, typically based on membership in a group of users, where authority applies to a certain software system. An example of such authority and software system is the view as engineer for configuration of control templates in a control system. Another example of user authority and associated software system is remote disk access in the current domain of an operating system. Yet another example is authority to create new orders in the order module of an Enterprise Resource Planning system. With commercial software products such as Microsoft's Windows 2000 (Trademark) it has become easier to utilize one workplace or workstation for several purposes. The specifications of the security model for Windows 2000 and Windows NT (Trademark) are available in the Microsoft MSDN online web site. The specification of the NT file system, NTFS (Trademark), is also available on Microsoft's web site. The security in NTFS is focused on handling security of files on one or several disks in a computer network.

Some progress have been made in the field of operating systems in order to facilitate improved security for programs available on a computer system having different security protocols. U.S. Pat. No. 5,604,490 describes an improvement to the security of an operating system. The operating system provides a security system of a computer or network having multiple security subsystems. The operating system unifies security protocols for each user based on unique user credentials. User credentials are associated with a so-called user handle, which is mapped to the unique user's credentials for each program procedure. Once a request to an object accessed through the server is requested, the system then grants access to the object based on the new user credentials associated with the handle.

There are certain problems that need to be addressed in a control and manufacturing execution system. One specific issue in control and manufacturing is that however well planned production is, the plan may need to be changed. There are many reasons why a production plan might not be feasible. For instance, if the allocated raw-material turns out to be of bad quality or of incorrect type, the planned lot cannot be produced. If at this stage the production plan cannot be met it would be beneficial for the operator to have access to the latest information on order stock. This to have a chance to choose the next best product to produce. A problem is that in a conventional production and manufacturing execution system the operator would at this stage either have to wait for information from a colleague or take the risk to run a product of a certain specification that might end up in stock. Even worse, it may not be possible to keep the process on hold and the operator might be forced to re-process or treat the raw material as waste. As an example, an operator may be supposed to produce a certain amount of aluminum of a type called A. The operator finds that the available raw material does not meet the specification required for product type A. But the raw material would allow the operator to produce product B. At this stage it would be beneficial to look in the production plan and search for product B. If product B is not planned for production, a search in the list of new orders may give a match so that production can be made against an order. However, even if this is the only type of search and access that the operator needs to do in the production planning and order system it can be a lengthy and costly procedure to make that possible. In worst case this means that not only would an operator have to learn several log in procedures, but also several different user environments for the software applications involved. In practice the result is that in a conventional control and manufacturing execution system there are only certain individuals that use certain software applications. Even though it would be beneficial for an operator to get an update on what the current order status is, by extracting that information from the order system, that is usually not considered secure and practical.

In the light of the problems mentioned above the inventors have found that there is a need for a system where user authority not only depends on the user who is logged in but also on relations between entities that the user interacts with. The system should adapt to changes in the control and manufacturing execution system during the time of a user log-in.

SUMMARY OF THE INVENTION

It is an aim of the invention to provide a computer system for security, which is integrated with a control system. Another aim is to provide a computer system for security, which is integrated with a system of software applications such as a manufacturing execution system.

It is another aim of the invention to provide a computer system where user authority not only depends on a user log-in to a workstation and an entity operated, but also adapt user authority to dynamic changes in relations between software representations of real world entities in a plurality of hierarchical structures.

A further aim of the invention to provide a computer system where security of a software object representing a real world entity depends on security inherited from other software objects representing other real world entities at higher positions in at a least two hierarchical structures.

It may be of help understanding the aims and advantages of the invention by studying the short description below of meta objects and aspects. A software object representing a real world entity may be implemented as a meta object. A meta object may also implement a software object which represents a more abstract entity. A meta object can be inserted into several hierarchical structures of meta objects. Each perspective of a meta object defines a piece of information, and a set of functions to create, access, and manipulate this information. A certain kind of aspect is a security aspect. An aspect can be inherited so meta objects at a lower position inherit aspects from one or more objects at a higher position in a hierarchical structure. This inheritance is different from traditional forms of inheritance in object oriented systems, in that it is not defined in terms of an object class hierarchy, but in terms of multiple structural relationships between different objects of otherwise unrelated classes. This is in contrast with an object being a specialization of a generic object class in a traditional object class hierarchy.

A further aim of the invention is to provide a computer system in which security of a meta object is based on at least two security aspects inherited through at least two hierarchical structures. Inheritance of one or more security aspects is made from, or through, a parent meta object in each hierarchical structure which the meta object is inserted into.

Yet another aim of the invention is to provide a computer system in which user authority to access an aspect of a meta object is based on at least two inherited security aspects from at least two hierarchical structures in combination with the user identity.

A principal advantage of the invention is that it allows security and user authority to adapt to changes of relations between meta objects in a plurality of hierarchical structures. In a computer system in which meta objects represent real world entities such changes can, for example, be the result of a products making progress through a manufacturing process.

Another principal advantage of the invention is that it enhances the interaction capabilities between users and different software systems in a secure and dynamic manner. The invention discloses a system that enables different software applications to cooperate to provide an integrated functionality of a meta object, in a secure manner.

It is a further aim to provide a computer system in which an inherited security aspect of a meta object is removed if the software object is deleted from a hierarchical structure in which the security aspect was inherited. This results in that the user authority to access an aspect of the meta object is dynamic during the time between log-in to log-out.

Further an aim is to provide a means for change of user authority from one user to another user as a meta object change position. The user authority defines the right to access a certain aspect of the meta object. Changes in position of a meta object can reflect that products are making progress between different process equipment.

Another aim of the invention is to provide a computer system, which includes means to list aspects matching a current user authority. An advantage of this is that the invention at hand reveals means to reduce the number of aspects of a meta object presented to a user on a screen, depending on a meta objects position in multiple hierarchical structures.

It is a further aim to provide a computer system in which the current security is independent of from which hierarchical structure a user selects a meta object.

The above mentioned aims are met by the invention as defined by the accompanying patent claims 1-27. In particular, a computer system for security in a computerized control system is defined by the independent claim 1 and a method for arranging security in a computer system, comprising a control system is defined by independent claim 10, and a computer program product according to claim 20.

The general inventive concept of the invention is that current user authority is based on, not only the identity of the user logged in to the system and the entity operated on, but also on relations between the entity operated on and other entities in a plurality of hierarchical structures.

DESCRIPTION OF PREFERRED EMBODIMENTS

In order to facilitate understanding of the invention, it is necessary to explain some details of a control system, a manufacturing execution system, meta objects, aspects and hierarchical structures.

Control System

Figure 1:
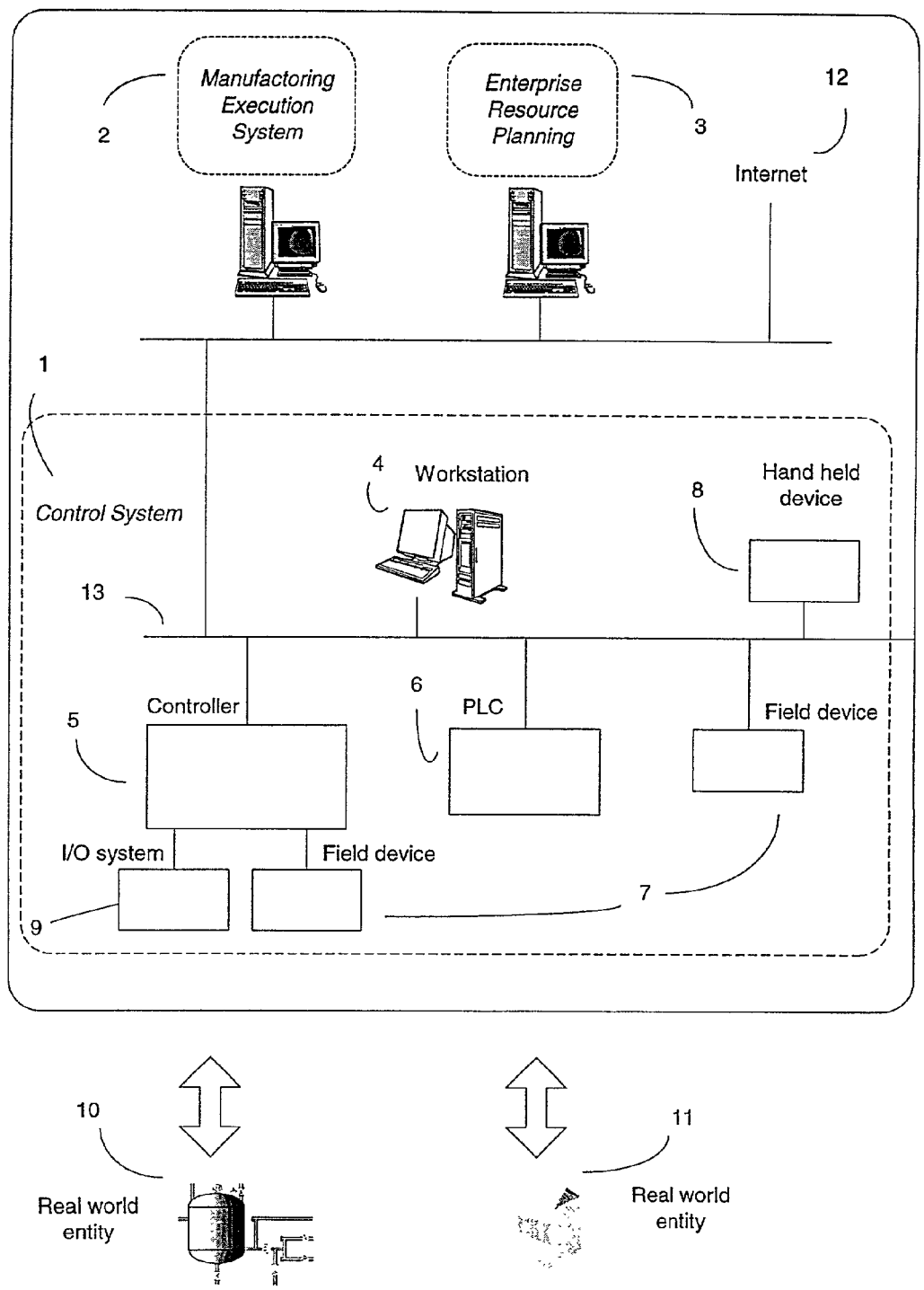
FIG. 1 is a simplified diagram of the components of a computer system, providing means for security in a control system and manufacturing execution system.

FIG. 1 shows a control system in a computer system. The control system 1 includes a plurality of workstations 4, hand-held devices 8, controllers 5, PLCs 6 and field devices 7. Communication 13 in a control system is made via cable or optical fiber. As an alternative, communication may also be wireless, for instance between hand-held devices 8 and workstations 4. Examples of hand-held devices are cellular phones, pocket size PCs and wireless programming devices. There are typically several types of communication protocols and standards, which the control system uses. TCP/IP and Ethernet are preferred between workstations, PLCs and controllers. The use of TCP/IP implies that Internet 12 based protocols and standards are used for remote access of the control system. Field buses are primarily used to connect field devices and with each other. Field buses are also used for communication between field devices, PLCs, controllers and workstations. Also input/output systems (I/O systems) 9 communicate primarily by means of field buses.

A software system for control and/or supervision is distributed between workstations, hand-held devices, controllers, PLCs and field devices. For instance a control program defining if a valve is to be opened or closed can execute in a CPU in the valve itself 7, in a PLC 6, in a controller 5 or in a workstation 4. Where the control program executes depends on the application and complexity of control problem. Supervision of real world entities is typically made from workstations or by use of hand-held devices. Other examples of software in a control system are process graphics and Supervision, Control and Data Acquisition (SCADA) functions.

Manufacturing Execution System

In FIG. 1 a manufacturing execution system 2 is a software-based system that consists of several software applications. Such applications are maintenance, quality assurance, inventory and laboratory systems. Examples of other such applications are supply management, production planning, environmental and energy management systems. Examples of communication standards used to connect computers 13 and workstations hosting manufacturing execution systems are TCP/IP and Ethernet. The manufacturing execution system 2 is typically connected to real world entities 10-11 through a control system 1.

Applications of a manufacturing system are typically applied to a production or assembly of real world entities such as trucks, cars, industrial goods, food, chemicals, pharmaceuticals, paper, metal, minerals, oil and gas. A manufacturing execution system or applications of such a system is also applied at industrial sites and in enterprises, which have control systems for other purposes than manufacturing. Examples of such sites and enterprises are power plants, power distribution networks and wastewater plants. Such plants apply some of the same modules of a manufacturing execution system such as maintenance, environmental and laboratory systems.

Meta Objects

In a control or manufacturing execution system a basic need is to keep together, manage, and provide access to information about all different real world entities at an industrial plant. FIG. 1 shows that control systems and manufacturing execution systems comprise software representations of real world entities 10-11. These real world entities are of many different kinds.

Figure 2:
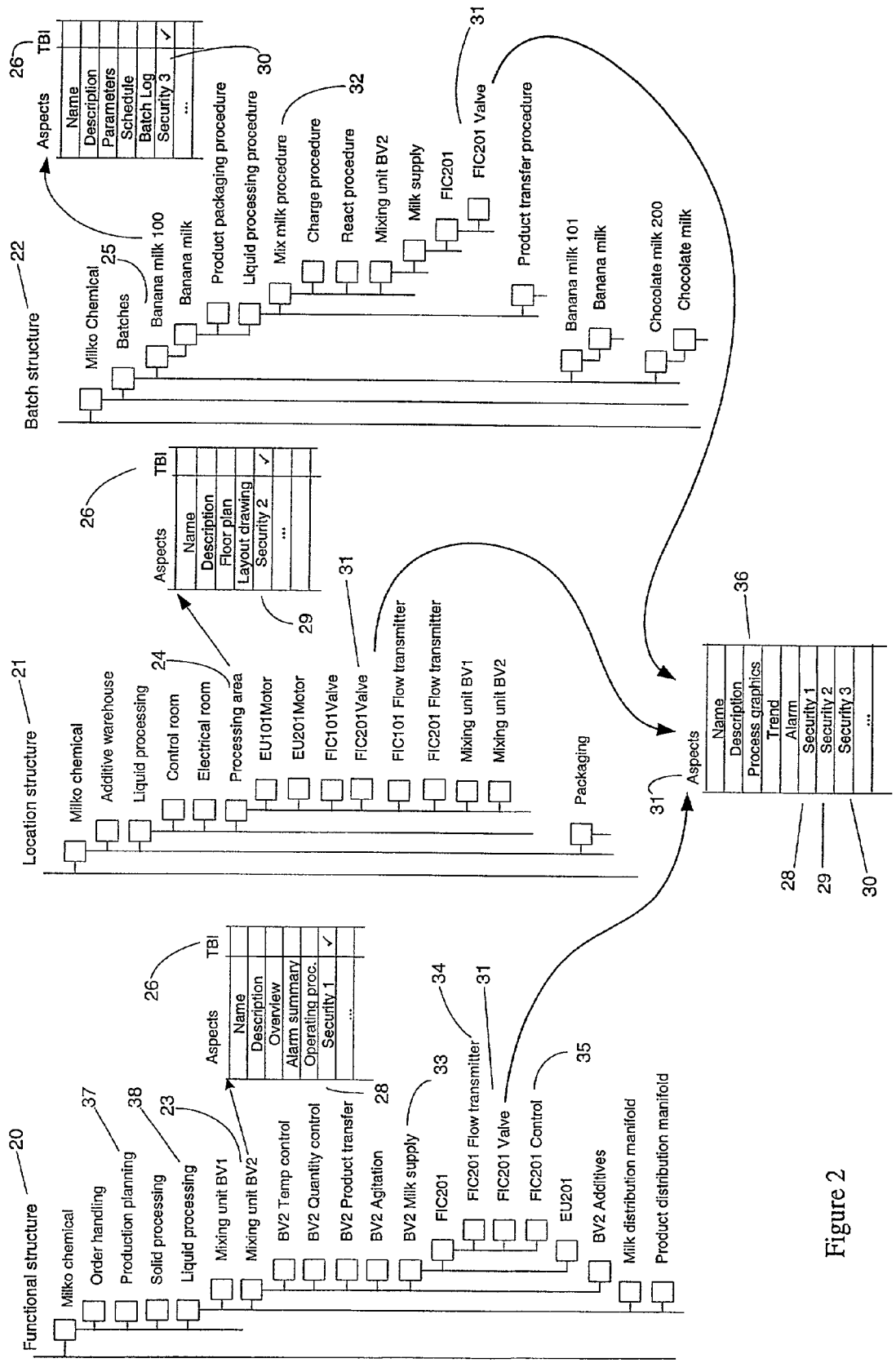
FIG. 2 shows schematically an embodiment of the invention, comprising inheritance of security aspects from parent meta objects in several hierarchical structures to a child meta object. The figure shows that relations of several entities in several hierarchical structures govern the current security of a meta object.
Figure 3:
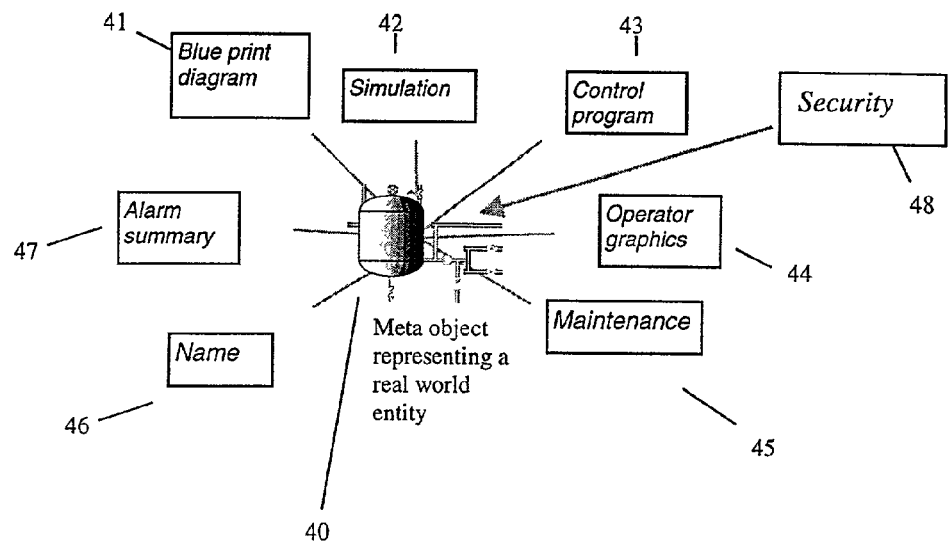
FIG. 3 shows schematically a meta object representing a real world entity; in this case the real world entity is one kind of process equipment. More precisely the meta object represents a mixing unit. The figure shows examples of software functions available as aspects. The meta object also associates a security aspect.

Examples of one kind of a real world entity are a valve, a transmitter, an actuator or a sensor. Another word for this type of real world entity, in this description, is a field device. FIG. 2 show examples of several real world objects, such as a valve 31, represented as meta objects. Examples of more complex real world entities are a mixing unit 23, a compressor, a reactor, a boiler, a conveyor or an industrial robot. Another word for this type of real world entity, in this description, is process equipment. FIG. 3 shows an example of such a complex real world entity 40. Other examples of process equipment are a switchgear, an air handling unit or a storage rack.

Figure 4:
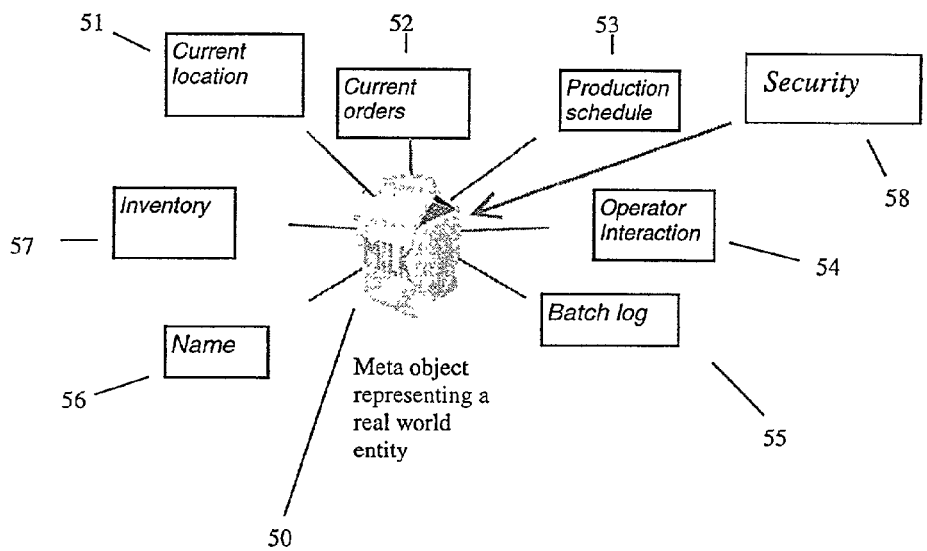
FIG. 4 shows another meta object representing a real world entity; in this case the real world entity is a product. More precisely the meta object represents a certain batch of a milk-based product. As the product makes progress through the process the user authority to access aspects of the corresponding meta object adapts to the position of the product relations to other meta objects in hierarchical structures.

Other kinds of real world entities at an industrial plant are process entities. Examples of process entities are products, material, batches, customers, etc. Process entities may be real world entities moving through a production line, like pharmaceutical ingredients to produce a certain batch. FIG. 4 shows an example of a software representation of such a real world entity 50. Process entities may also be objects of such type that they are not physically present in the plant, but do have representation by means of software objects in the control and manufacturing execution system. Examples of such process entities are customers and orders.

Field devices, process equipment and process entities are represented by means of meta objects. A meta object is not an object in the traditional meaning of object oriented systems, but rather a container of references to implementation of its aspects. In a preferred embodiment of the invention meta objects and aspects are implemented with some form of object oriented technology, such as COM. A set of interfaces are defined to allow aspects to co-operate using common services.

Meta objects have relations to other meta objects. A first meta object 31 that is inserted at lower position in a hierarchical structure than a second meta object 24 is called a child of the second meta object. The second meta object 24 is referred to as the parent of the first meta object 24.

A certain meta object can at any point in time be represented in any number of structures, and at any number of positions in any one structure. Thus, at any point in time, the meta object may have any number of parent meta objects. This is illustrated in FIG. 2, where the meta object 31 at the same time is represented in a functional structure 20, in a location structure 21, and in a batch structure 22. In each of said structures the meta object 31 has a parent.

In addition to representing field devices, process entities and other entities, meta objects have other functions. For instance, meta objects are also used to represent groups of objects and define how such groups of objects are to be inserted into hierarchical structures and also how those objects relate to each other.

Aspects

A meta can be described from several different perspectives. These different perspectives are represented as aspects associated with a meta object. Each aspect defines a piece of information, and a set of functions to create, access, and manipulate this information. FIG. 3 shows a meta object representing a mixing unit. One aspect could represent a blue print diagram 41 of the mixing unit, another aspect represents a control program of the mixing unit 43 and yet another aspect could represent operator graphics 44.

As shown by FIG. 1, at a production site there are other software applications besides the control 1 and manufacturing execution system 2. These software applications are for example used for enterprise resource planning 3 such as accounting, order handling and human resources. Also software applications for office and back-office purposes may exist at a site. These applications run in a heterogeneous environment, i.e. at a production or manufacturing site there are several software applications that are partly compatible. Together these applications support the total production and manufacturing execution system scenario. These software applications may in many cases not be local to a production site but rather distributed with the use of, for example, Internet technology.

In a system where security is based on the invention, a function or a method of such software application is embedded as a part of an aspect. Embedded as a part of an aspect means that the main functionality of the aspect may be entirely based on a software application. Referring to FIG. 4 an aspect called "current orders" 52 can include a call to the order handling system. The call to the order handling system results in a list of orders returned to the aspect. In the implementation of the aspect there might be additional functions, which are not part of the order system. For instance a call to the aspect "current orders" may result on different ways of formatting and representing the current orders on a screen depending on if the result is to be presented on a workstation, a handheld device or a cellular phone. In an embodiment of the invention the user authority to access a function of a software application embedded in an aspect, is governed by the current security of a meta object. The invention enables the software functions implemented as aspects to interact in a secure manner.

Security Aspect

One type of aspect is a security aspect. FIG. 3 shows a meta object 40 representing process equipment such as mixing unit having a security aspect 48. FIG. 4 shows a meta object 50 representing a process entity having a security aspect 58.

Permissions in a security aspect of a meta object define what kind of user access is allowed. Examples of permissions are "view", "operate", "control", "administrate", "tune", "allocate", "order" etc.

Figure 6:
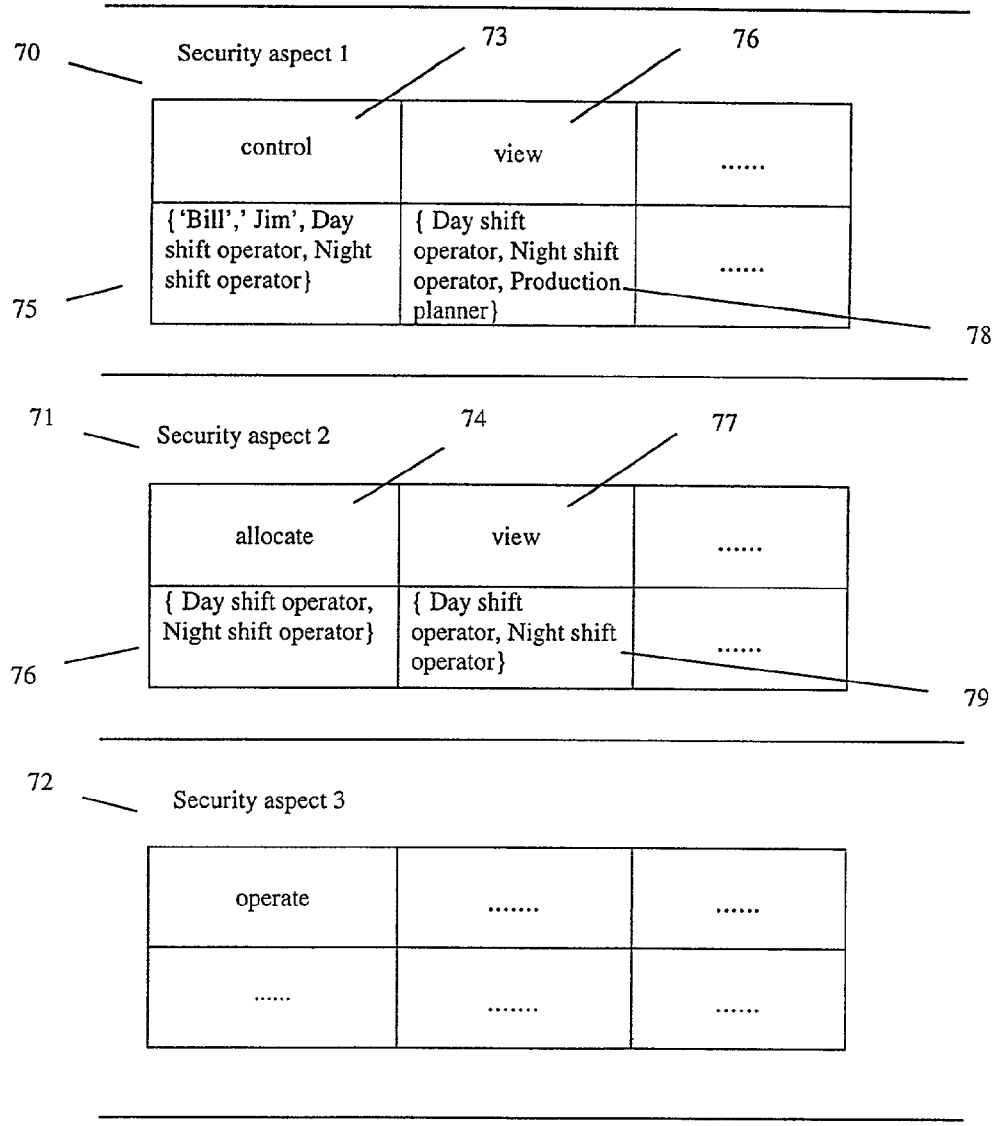
FIG. 6 shows an example of a set of security aspects inherited to a meta object. It is the combination of the inherited security aspects from multiple structures that defines the current security of a meta object.

FIG. 6 shows a plurality of security aspects inherited to a meta object. A security aspect comprises a number of permissions. In the security aspect each permission (73, 76) is associated with a list of users (75, 78). An entry in the list is an individual user or a group of users. Each list of users is applicable for a certain permission. As an example a permission "view" could be associated with a list of users, which includes individual users as well as a group of users. For instance "view" could be applicable for a certain user called Bill, a certain user called Jim, a group of users involved in production planning and a group of process operators. Such a list could look like {'Bill', 'Jim', Production planner, Day shift operator}.

To define a list of users where the list is associated to a certain permission is well know to a person skilled in the art and as such part of prior art.

In a preferred embodiment at least two security aspects of a meta object define a user's right to access the meta object, and in particular, the user's right to interact with aspects associated with said meta object. Once a user has performed a log-in to the system, the current user authority to access an aspect of a meta object is governed by a current set of security aspects and the configuration of those security aspects.

The validity of a certain permission depends on each aspect the permission is applied to. The valid permission to access an aspect is defined in the aspect itself. A certain permission may be valid for several aspects. For instance the permission "operate" may be valid for an aspect, such as the function to start transportation of goods, for a meta object representing a conveyor system. Within the same meta object the permission "operate" may also be valid for an aspect calling up a process graphic display for allowing change of speed and load of the conveyor. Set up of permission's validity for a certain aspect is configurable by a system administrator. To access certain aspects a combination of permissions is needed.

Hierarchical Structures

To manage all the information in a control and manufacturing execution system, it must be organized in some way. One efficient way to organize process control and manufacturing information is to use a concept called structures.

FIG. 2 shows three structures: functional structure 20, location structure 21 and batch structure 22 in which meta objects are inserted. Each of the structures in FIG. 2 is a hierarchical structure.

A meta object representing an entity is typically represented in several hierarchical structures at the same time. For example, a certain piece of process equipment has a certain position in a functional structure depending on the functional breakdown of the plant. It has also a physical position, and thus it has a place in a location structure. The same piece of equipment may currently be allocated to a certain production order, so it belongs to an order structure. Because it is used to produce a certain product, it fits in a product structure.

As an example, in FIG. 2 the valve 31 FIC201 is inserted into a functional, location and batch structure. Although not shown, it should be appreciated that a meta object may also reside in multiple positions within one hierarchical structure.

In the invention at hand the relations between the entity operated on and other entities govern the security in a computer system. The relations are described in terms of hierarchical structures such as functional structure and location structure. Other hierarchical structures can be order structure, control structure or batch structure. This means that in the invention at hand, current authority is governed not only by the user who is logged and the entity operated on, but also on relations between entities.

Inheritance of Security from Parent Meta Objects in a Hierarchical Structure

FIG. 2 shows inheritance of security in a hierarchical structure, such as a functional structure 20.

A security aspect of a meta object is inherited from a parent object in a hierarchical structure. A child can in its turn be a parent object, which in its turn has other children; hence a security aspect can be inherited through the hierarchy of a structure. The parent meta object 23 associates a number of aspects. The security aspect, or aspects, of a parent meta object include a flag TBI—"To Be Inherited" 26. As an example in the functional structure one meta object 23 could represent a mixing unit. Its children in that hierarchical structure would inherit the security aspect marked "To Be Inherited" 26. The meta object milk supply 33, being a child of the mixing unit 23, would inherit that security aspect. Meta objects inserted below the milk supply would in turn inherit the same security aspect. A meta object inserted below the milk supply 33 could be a functional unit FIC201 consisting of a control program 35, a flow transmitter 34 and a valve 31. It is at the time of insertion into the functional structure that the children of the mixing unit inherit the mixing unit's security aspects.

As described in the exemplified embodiment above, a security aspect of a parent meta object is inherited down through a hierarchical structure. Inheritance occurs providing a security aspect is set "To Be Inherited". Inheritance is not limited to the direct children of the parent meta object, but inheritance occurs for all descendents of the parent meta object in a certain hierarchical structure.

In FIG. 2 each of the meta objects 23-25 have been configured with a security aspect. The meta objects are parent meta objects in relation to their children. For each security aspect 28-30 marked "To Be Inherited" 26, each permission and associated list of users is held by each of the parent meta objects 23-25.

Inheritance occurs in the event caused by a meta object being inserted into a hierarchical structure. In a preferred embodiment of the invention the inheritance of a security aspect through a structure is independent of, whether the event is caused by a parent meta object being inserted at a higher position (23), or by a child meta object being inserted at a lower position (31). Inheritance of the security aspect is applied as long as a meta object (23) with a security aspect set "To Be Inherited" is placed at a higher level.

As briefly described above, in addition to represent field devices and process entities as software objects, meta objects implement other more abstract objects. Also in those representations the meta objects inherit security aspects.

Inheritance of Security from Meta Objects in Multiple Hierarchical Structures

In an embodiment of the invention a meta object representing a real world entity inherits security aspects from several hierarchical structures.

FIG. 2 shows an example of that a meta object representing a valve 21 inserted in a functional structure 20, can also be inserted into a location structure 21 and a batch structure 22. In each hierarchical structure the meta object representing the valve could inherit a security aspect 28-30. The combination of these security aspects is the base for the current authority.

As an example, a valve 31 may be located in a specific room belonging to a processing area 24, which makes it a child of a processing area in the location structure 21. The valve has a certain processing functionality, which makes it a child to a meta object representing milk supply 33 of a production cell such as a mixing unit 23 in the functional structure 20. The valve and other processing equipment are currently allocated to a certain banana milk batch 25, which makes the valve a child in a batch structure 22.

Since the meta object can be inserted in multiple structures at the same time, it will inherit security settings from multiple meta objects in multiple structures.

Figure 7:
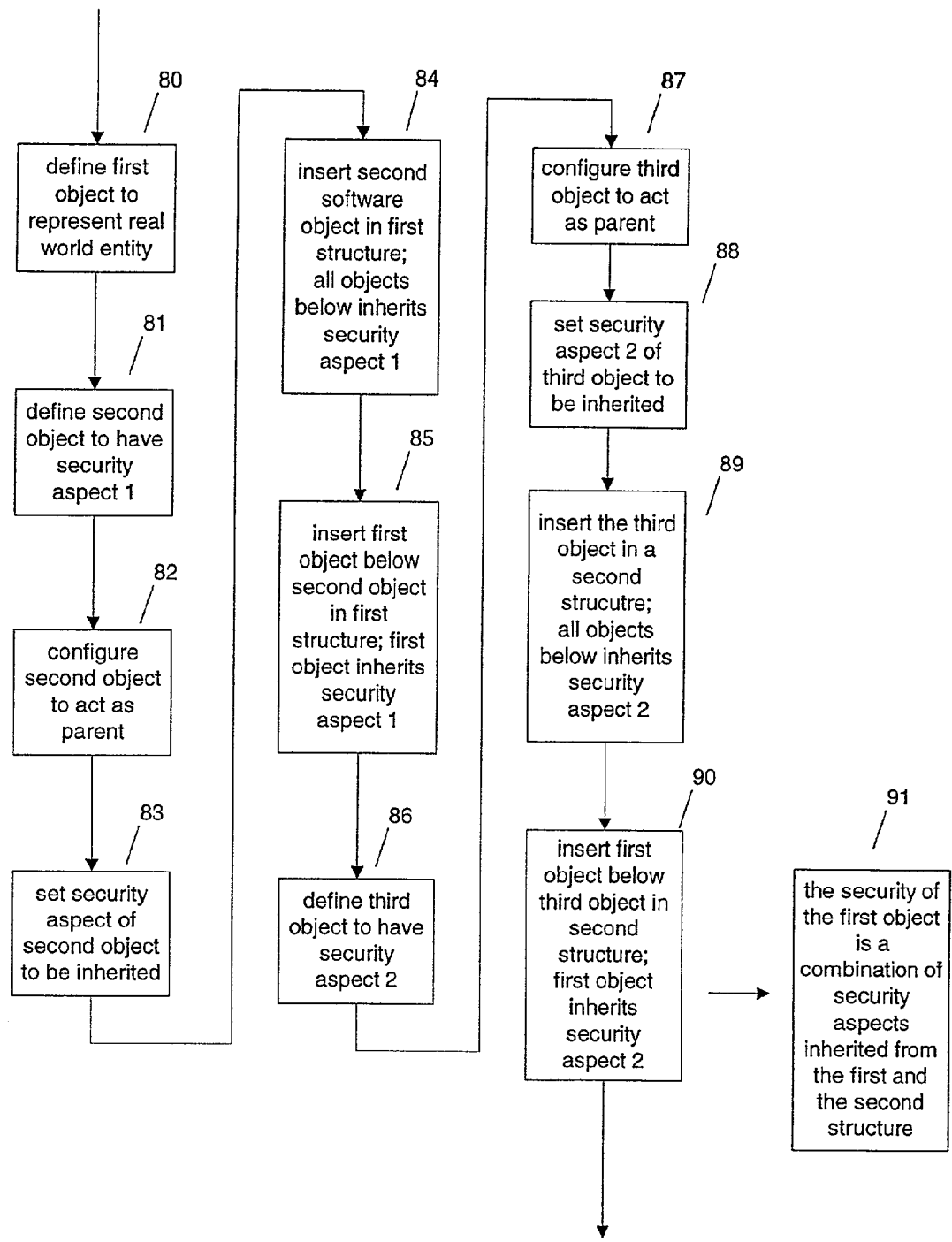
FIG. 7 is a flowchart of a method to arrange security in a computer system.

FIG. 7 is a flowchart of a method to configure security of a meta object by inserting the meta object in multiple structures.

FIG. 2 shows an example where a meta object 31 has inherited three security aspects 28-30, which three corresponding references are held by the meta object 31. Access to a certain inherited security aspect 28 of the meta object 31 is made by reference of the security aspect. That security aspect is marked "To Be Inherited" 26 in a parent meta object and is held by the parent meta object 23 at a higher position in a hierarchy.

Dynamic Security and Dynamic User Authority of Meta Objects in Multiple Hierarchical Structures Further in a preferred embodiment, as the meta object is deleted from its position in a certain hierarchical structure, the meta object dis-associates the security aspects previously inherited from, or inherited through, its parent in that hierarchical structure. The security is dynamic. Since the user authority is based on the security the user authority to access at least one aspect of a meta object is dynamic during the time between log-in and log-out.

When the meta object is inserted in a different position in the same hierarchical structure, or in a different hierarchical structure, it inherits new security aspects from its new parent meta object.

In a preferred embodiment, a meta object can be moved between different positions in one or several structures, for example, representing products moving through an assembly line, or production orders being allocated to different process equipment. To move a meta object in a hierarchical structure is from the standpoint of inheritance of a security aspect, equivalent of first deleting the meta object from its position in a hierarchical structure and then inserting the meta object at a new position in a hierarchical structure.

User

A user belongs to a group of users having a certain responsibility. Such groups of users are operators, control engineers, order administrators, sales persons, production planners or maintenance managers. In addition to belonging to a group each user has a user identity.

The user is typically a person. But a user is considered to be any owner of a process logged on to the security system. For instance the user can also be a process created by a script or program running on a computer or processor, where the process perform actions such as retrieving information to a production report.

User Log In

A user is identified through a log in procedure. The log in procedure can include steps such as enter a user name and a password on the screen via a key-board, the use of a physical device such as key to unlock an operator key-board or the use of a smart card for identification. The log in procedure could also be made via a hand-held device or by use of the identity of user already logged in to an operating system of for instance a workstation. The software, handling the log in procedure to the system, is executing in one or several workstations.

After log-in the user is recognized and identified with the help of a unique user identity. In addition to have a unique identity; the user may be recognized to belong to one or several groups of users.

The invention at hand discloses a method to let the authority be dynamic during the time between a log-in and a log-out. Security aspects of the meta object, which the user interacts with, govern authority. As describe above, these security aspects are dynamically inherited from other meta objects through inheritance in a plurality of hierarchical structures. Since the security of a meta object is dynamic, the user authority is dynamic. Hence, the authority depends dynamically on which meta object the user accesses and the relations of that meta object to other meta objects in a plurality of hierarchical structures.

Evaluation of Current User Authority

In FIG. 3 and FIG. 4 it is shown that a meta object 40, 50 is associated with a current security 48, 58. In an embodiment of the invention, evaluation of the current user authority to access an aspect 41-47, 51-57 of the meta object 40, 50 is made by means of an access check function.

The access check function 100 use references to the current user identity 101, the identity of the meta object 102 and the identity of the aspect 103 as inputs to perform the evaluation.

Figure 8:
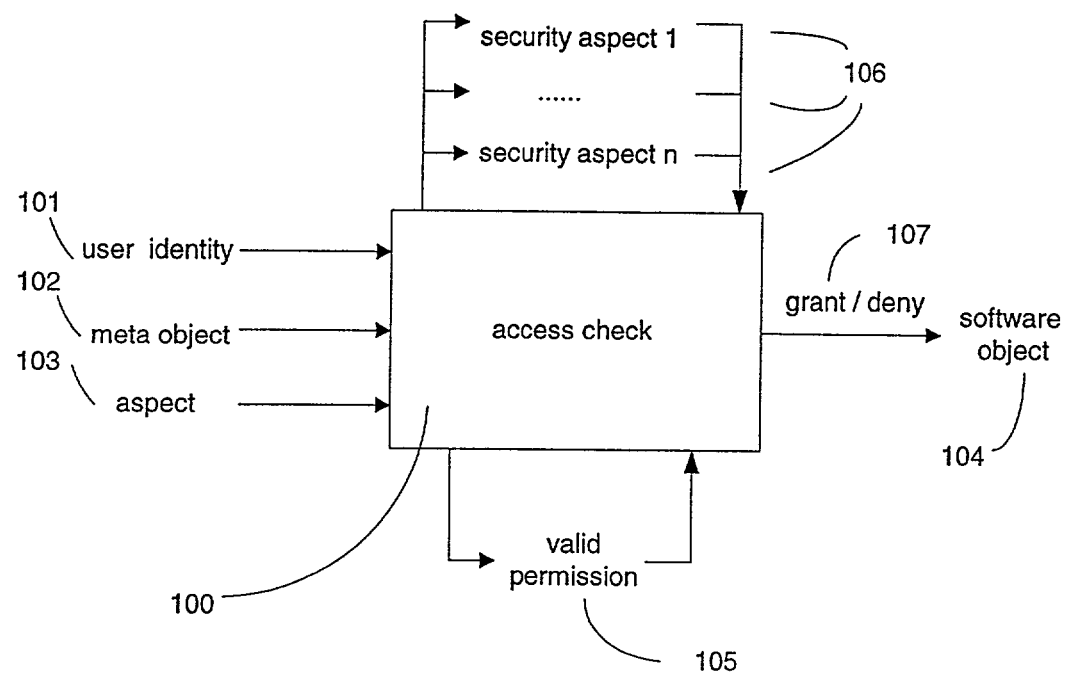
FIG. 8 shows an access check function, which evaluates a user's authority to access an aspect of a meta object. The result of the access check depends on inherited security aspects from multiple structures.

FIG. 8 shows an access check function 100. The check is made by means of mapping the current security aspects of a meta object with the user identity and the valid permission for the user to access a certain aspect.

The function retrieves information about valid permissions 105 from the aspect 41-47, 51-57 which the user tries to access. For an aspect a certain permission, or a combination of permissions, are valid.

The function checks all of the current security aspects 106 of the meta object. The function evaluates if there is a match between the previously retrieved valid permission, for instance "allocate", and a permission in any of the security aspects. Refer to FIG. 6, which shows security aspects 70-72 for details on permissions.

Providing there is a match of permissions, the function checks that the user identity 101 has a match in the list of users 75-76, 78-79, corresponding to the permissions 73-74, 76-77, in the security aspects. As a result of the access check, the user will be granted or denied access.

Priority of Hierarchical Structures

In the invention at hand, security aspects inherited from different hierarchical structures to a certain meta object usually define different permissions. But one security aspect can define a permission allowing access to a certain aspect while another security aspect inherited from another hierarchical structure can disallow access. For that reason the system includes a definition of priority between hierarchical structures.

As an example in FIG. 2 a functional structure 20 is defined to have priority over a location structure 21. A meta object representing a valve FIC201 31 inherits security aspects from a functional structure and a location structure. FIG. 6 shows the inherited security aspects of the valve in the example. In the inherited security aspect 70 a group of users, for instance dealing with production planning, is allowed the permission "view" 76, 78. The valve FIC201 also inherits a security aspect from the location structure 71. In that inherited security aspect 71 the production planning group is denied the permission "view" 77, since the group is not in the corresponding list of users. But since the functional structure is defined to have a higher priority, in which the group production planning is allowed access, a user belonging to the production planning group can access any aspect of the meta object that has defined the permission "view".

Log In to a Plurality of Software Applications

Referring once again to FIG. 3, a user only has to log in once, even if there are several software applications involved. In one embodiment of the invention a log in to such a software application through an aspect does not result in that another user environment is started. Rather a result of a function call is displayed. As an example a list of article numbers of spare parts for a pump, being a child of a process equipment object 40, may be displayed by means of a maintenance system 45 without the user having to perform another log-in. In order to list article numbers of spare parts the aspect may include a plurality of software functions of the maintenance system. The user authority to access a plurality of these software applications depends on the relations between the meta object operated on and the relations between the meta object and other meta objects in a plurality of hierarchical structures. The invention discloses a system that enables different software functions of a plurality of software applications to cooperate to provide an integrated functionality of a meta object, in a secure manner.

Change of User Authority from One User to Another User

In a preferred embodiment the user authority to access a certain aspect of a meta object, changes from one user to another, as the meta object change position in a hierarchical structure. For instance the right to access allocation of raw material can change from a production planner to an operator as a product is moved from planning phase into process.

Such an example is a plant producing products based on milk in FIG. 2. At the plant one software application is used for production planning and another software application is used for handling the allocation of additives. During the production planning phase an individual user of the user group called production planner, is dealing with preparation of a new production lot. The production planner is logged on to a system as defined by the invention.

Even if the production lot does not yet have any physical corresponding real world entity, a meta object is created at this stage. The user, via the meta object which represents the lot, invokes the functions of the production planning software. In FIG. 2 the meta object would at this stage belong to the functional structure 20 and, more specifically, be a child of production planning 37. The security aspect of the meta object is inherited from a parent meta object, in this case the production planning object.

The inherited security aspect of the child meta object defines authority also to systems that can be regarded as secondary from the perspective of a specific group of users or individual user. As the lot is in a planning phase, the production planner has authority to allocate and de-allocate additives in an inventory system 57, see FIG. 4. The inventory system is regarded as secondary from the production planner's point of view. Allocation of additives is made through an aspect of the meta object representing the lot. That a call to such a function is made to another software application is hidden from the user. The allocation of additives can for instance be made based on a main recipe containing a list of ingredients and a desired volume, which is order specific, for the lot. As the user of the production planner group has finalized all necessary planning steps, including allocation of additives, the lot is considered to be ready for production. Once the lot is planned for production the meta object is moved to another position in the functional structure.

As the meta object is moved it looses the security aspect inherited from the production planning parent meta object. Instead the meta object inherits the security aspect of the parent meta object at the current position of the functional structure. At this position the lot is considered to be in process. While a lot is in process a certain operator having the responsibility of a certain process line gets the authority to allocate and de-allocate additives, such as the liquid processing line 38 in FIG. 2. The operator is using a system for process control as the primary system. The inventory system for allocating additives is considered to be a secondary system to the operator. The meta objects representing ingredients in the raw-material system, which were previously allocated to the lot, are now under control of the operator. The security aspect of the meta object representing the lot no longer allows the production planner to change the amount of allocated material.

List and Access to Aspects

Figure 5:
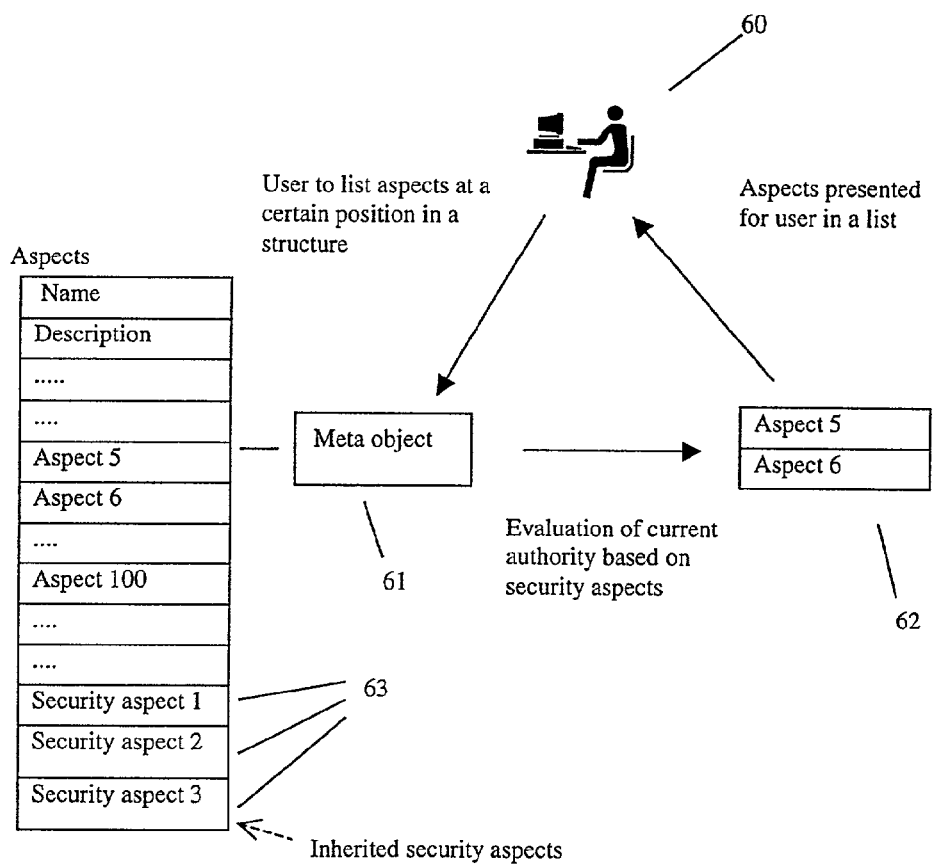
FIG. 5 is a diagram, which shows that aspects available for user access are depending on a set of inherited security aspects. The user lists the available aspects on a screen.

FIG. 5 shows how to reduce the number of aspects presented to a user at any given time. In addition to methods and functions as mentioned above, the invention at hand improves the user interaction by reducing aspects presented in a list based on the current security of a meta object. A user 60 can list aspects that the user is allowed to access on the screen of a workstation or on a hand-held device. The list 62 is preferably presented in a pop-up menu. Only the aspects of a certain meta object that a user has current authority to access are presented in the pop-up menu. Depending on configuration of the system, the aspects that a user does not have current authority to access are either not presented at all or are dimmed in the list. This implies that a software function implemented as an aspect may only be listed on a screen via a meta object at certain positions in a plurality of hierarchical structures. As an example a meta object 61 has inherited security aspects 63 from different hierarchical structures. The user 60 is presented with a list 62 of aspects based on the current set of security aspects.

As an example a meta object represents a production lot, such as banana ice cream. The lot is to be produced and packaged. During production several process graphic displays were available for operator access. During production, as the operator listed aspects of the lot, those process graphic displays were visible in the list. After production and packaging the lot is moved in the location structure to the freezer warehouse. But as the lot is moved to the freezer warehouse, the process graphic display for control is not applicable. In the invention at hand the security aspects of the produced lot reflects that the process graphic display is applicable as the lot is in process, but is not applicable as the lot is in the freezer warehouse. As the lot is in the freezer warehouse and a user lists aspects, process graphic display interactions are no longer shown in the list of aspects.

In an embodiment of the invention the current security of a meta object is independent of from which hierarchical structure a user selects a meta object. That implies that the current user authority is independent of from which hierarchical structure a user selects a meta object. For instance as in FIG. 2, a valve 31 is inserted to a location 21 and a functional structure 20. The user authority to access a process graphic display 36 of the valve is the same, no matter if the user selects the valve in the location 21 or functional structure 20.

It should be appreciated that the applicability of the present invention is not limited to functions of traditional control systems or manufacturing execution systems for use in industrial applications, but extends as well to many other areas. This includes business and commercial activities such as production management, purchasing, design, business and financial systems. The applicability of the invention also includes control of equipment in locations such as in an office building, a residence, a ship or a home. The applicability of the invention also extends to computer based infrastructures such as electrical power distribution, phone and communication networks as well as support systems for roads and railways. Therefore it should be appreciated that whilst exemplifying embodiments of the present invention have been described in relation to systems including valves, process vessels, mixing units and batches embodiments of the present invention are applicable to any other suitable type of entities.

It is also noted herein that while the above describes exemplifying embodiments of the invention, there are several variations and modifications which may be made to the disclosed solution without departing from the scope of the present invention as defined in the appended claims.

The invention claimed is:

1. A method for authority checking in a computer based control system for industrial process or manufacturing control, the control system comprising software means for representing real world entities as software objects which hold functions and information related to said real world entities, means for organizing software objects in at least two hierarchical structures, means for identifying a user at the time of log-in to the system, and means for identifying a logged-in user with a user identity between the time of log-in and log-out, comprising the following steps:

inserting a first software object into at least two hierarchical structures, adding a security settings to each of at least a second and a third software objects, which are placed at positions higher than the first software object, one in each of the said at least two hierarchical structures, inheriting to the first software object through said at least two hierarchical structures the security settings that are associated with said at least second and third software objects, determining, based on the user identity and on the inherited security settings, a user's authority to access at least one function or piece of information of the first software object.

2. The method according to claim 1, wherein each security setting defines permissions that are granted or denied for a specific user or group of users to access at least one function or piece of information of the software object to which the security setting is added.

3. The method according to claim 1, comprising the additional step of defining a priority between said at least two hierarchical structures, where said priority is used to determine which security setting has priority when at least two security settings have been inherited to a software object through said at least two hierarchical structures, and the security settings define different authority for a user to access at least one function or piece of information of the software object.

4. A method according to claim 1, wherein each of said software objects is implemented as a Meta object, and functions, information, and security settings held by the software objects are implemented as aspects.

5. A method according to claim 4, wherein each aspect includes information about what permissions are required for accessing the aspect.

6. A method according to claim 5, wherein a user's authority to access an aspect of a Meta object is determined by comparing the permissions granted or denied by the security aspect with the permissions that are required by said aspect.

7. A method according to claim 4, additionally characterized in that a user interface wherein a Meta object has been selected presents only those aspects held by the selected Meta object that the user has authority to access.

8. A computer based control system for industrial process or manufacturing control, including computer program means arranged, when loaded into a computer, to make the computer carry out the steps of the method according to claim 1.

9. A computer program product loaded into a computer or processor to carry out the steps of the method according to claim 1.

10. The computer program product according to claim 9 embodied on one or more non-transitory computer readable media.

11. A method for authority checking in a computer based control system for industrial process or manufacturing control, the control system comprising software means for representing real world entities as software objects which hold functions and information related to said real world entities, means for organizing software objects in at least two hierarchical structures, means for identifying a user at the time of log-in to the system, and means for identifying a logged-in user with a user identity between the time of log-in and log-out, comprising the following steps:

inserting a first software object into at least two hierarchical structures, adding a security settings to each of at least a second and a third software objects, which are placed at positions higher than the first software object, one in each of the said at least two hierarchical structures, inheriting to the first software object through said at least two hierarchical structures the security settings that are associated with said at least second and third software objects, determining, based on the user identity and on the inherited security settings, a user's authority to access at least one function or piece of information of the first software object, wherein the security setting previously inherited through a first hierarchical structure is disassociated from said first software object when said first software object is removed from said first hierarchical structure; whereby a user's authority to access at least one function or piece of information of the software object is dynamic during the time between log-in and log-out.

12. A method for authority checking in a computer based control system for industrial process or manufacturing control, the control system comprising software means for representing real world entities as software objects which hold functions and information related to said real world entities, means for organizing software objects in at least two hierarchical structures, means for identifying a user at the time of log-in to the system, and means for identifying a logged-in user with a user identity between the time of log-in and log-out, comprising the following steps:

inserting a first software object into at least two hierarchical structures, adding a security settings to each of at least a second and a third software objects, which are placed at positions higher than the first software object, one in each of the said at least two hierarchical structures, inheriting to the first software object through said at least two hierarchical structures the security settings that are associated with said at least second and third software objects, determining, based on the user identity and on the inherited security settings, a user's authority to access at least one function or piece of information of the first software object, moving said software object from a first position in a first one of the said at least two hierarchical structures to a new position in any of the hierarchical structures, disassociating from said software object a security setting previously inherited in the first position through the first hierarchical structure, inheriting a different security setting in the new position through said any of the hierarchical structures, whereby a user's authority to access at least one function or piece of information of the software object is dynamic during the time between log-in to log-out.

* * * * *